(12) United States Patent
McIntyre

(10) Patent No.: US 8,050,022 B2
(45) Date of Patent: Nov. 1, 2011

(54) SYSTEM AND METHOD FOR COVERING A MONITOR SCREEN

(75) Inventor: William Charles McIntyre, Broomfield, CO (US)

(73) Assignee: William C. McIntyre, P.E., LLC, Broomfield, CO (US)

( * ) Notice: Subject to any disclaimer, the term of this patent is extended or adjusted under 35 U.S.C. 154(b) by 505 days.

(21) Appl. No.: 12/259,812

(22) Filed: Oct. 28, 2008

(65) Prior Publication Data

US 2010/0102197 A1   Apr. 29, 2010

(51) Int. Cl.
*G06F 1/16* (2006.01)
(52) U.S. Cl. ......... 361/679.24; 361/679.21; 361/679.01; 248/689; 248/226.11; 248/316.1; 248/316.7; 24/489; 24/499; 359/83; 349/58
(58) Field of Classification Search .......... 248/689, 248/475.1, 489, 917, 226.11, 316.1, 316.7; 24/489, 499; 349/58, 59, 60; 345/55; 359/83; 361/679.21, 679.24, 681
See application file for complete search history.

(56) References Cited

U.S. PATENT DOCUMENTS

| | | | | |
|---|---|---|---|---|
| 6,104,451 | A * | 8/2000 | Matsuoka et al. | 349/58 |
| 6,808,148 | B1 * | 10/2004 | Eakle et al. | 248/309.1 |
| 7,267,313 | B2 * | 9/2007 | Krzoska et al. | 248/316.8 |
| 7,644,900 | B2 * | 1/2010 | Yap et al. | 248/304 |
| 7,978,283 | B2 * | 7/2011 | Tsutsumi et al. | 349/59 |

* cited by examiner

*Primary Examiner* — Terrell Mckinnon
*Assistant Examiner* — Todd M. Epps
(74) *Attorney, Agent, or Firm* — Holland & Hart LLP

(57) ABSTRACT

A screen cover temporarily protects the screen of flat panel monitors. The screen cover generally includes a planar screen shield, which may be positioned in front of the monitor screen, and a plurality of elongated retention arms that are moveable between releasing and secured positions, which engage a rear surface of the monitor. The retention arms may include one or more articulating joints that employ springs to bias the retention arms toward a secured position. Some of the retention arms may extend from corner covers that removably receive corner portions of the shield. Springs may be slidably coupled with the corner covers to removably secure the corner covers with the shield under tension.

15 Claims, 2 Drawing Sheets

SYSTEM AND METHOD FOR COVERING A MONITOR SCREEN

BACKGROUND

Flat panel monitors have become ubiquitous, providing users with video displays that are lighter and much thinner than traditional monitors such as cathode ray tubes (CRTs). Oftentimes, flat panel monitors are less than 4 inches thick, which can be as much as six or more times as thin as traditional monitors of various sizes. Examples of flat panel monitors include, plasma displays, liquid crystal displays (LCDs), organic light-emitting diode displays (OLEDs), light-emitting diode displays (LEDs), electroluminescent displays (ELDs), and the like. While some forms of flat panel monitors are found within various portable devices such as laptops, cellular phones, and digital cameras, larger flat panel monitors have become mainstream in home theaters, bedrooms, bathrooms and kitchens.

Flat panel monitors have traditionally been sold at prices that exceed alternative monitors, such as CRTs. Accordingly, great care is taken when shipping and storing flat panel monitors. Commonly, layers of bubble-wrap, paper, and/or polystyrene have been positioned around the flat panel monitors before they are placed in one or more cardboard boxes. However, once the flat panel monitor is placed in use, such packing materials are seldom if ever kept by the owner. Such materials may be difficult to obtain or effectively apply to the flat panel monitors when available. Moreover, such materials may be cumbersome to remove from the flat panel monitors and leave the user with a pile of excess waste materials for disposal. Therefore, moving the flat panel monitor to a new location, whether it is from one room to another or from one state to another, has presented a number of challenges in effectively protecting the monitor screen from unintentional scratches or impacts.

When flat panel monitors are placed in service, their flat screens tend to effectively reflect light being emitted from external sources. Such light manifests itself in the form of annoying glare and image reflections that make it difficult for users to clearly view images being displayed on the flat panel monitor. Effective, removable, anti-glare shields have not been heretofore provided for use with flat panel monitors, let alone an anti-glare shield that may be used to protect the screen from damage.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Various embodiments of a system and methods of use are provided for protecting a flat panel monitor screen. The system includes a planar screen shield having first and second opposing surfaces and a peripheral edge portion. A plurality of elongated retention arms are positioned about the peripheral edge portion of the screen shield. At least some of the retention arms are moveable between a releasing position, where the distal end portions of the retention arms are positioned to extend away from the screen shield, and at least one secured position, where the distal end portions of the retention arms are positioned to extend toward the second surface of the screen shield. In some embodiments, the retention arms may be biased toward the secured position, in which the distal end portions of the retention arms releasably engage the flat panel monitor and hold the system in place.

In various embodiments, the retention arms may be provided with one or more articulating joints between the proximal and distal ends of the retention arms. In such embodiments, the articulating joints may include a spring that automatically biases at least a portion of the retention arms toward a secured position. Some embodiments of the retention arms may be provided to be pivotably coupled with the screen shield and may include a spring that biases at least a portion of the retention arms toward a secured position.

The system may be provided to mimic a shape of the flat panel monitor. As such, the peripheral edge portion of the screen shield may be shaped to define at least a plurality of corner portions, whereby the screen shield is provided with a rectangular shape. In some embodiments, at least a pair of the retention arms are positioned closely adjacent two or more corner portions of the screen shield, whereby each pair of retention arms is positioned to surround a corner portion of the screen shield. An additional retention arm may be positioned to extend from an apex of one or more of the corner portions, intermediate each pair of retention arms.

In various embodiments, the system may couple at least some of the retention arms with one or more corner sleeves, which are each formed to have a peripheral edge portion and an open pocket. The pocket of each corner sleeve is shaped to releasably receive a corner portion of the screen shield. The retention arms extend from the peripheral edge portion of the corner sleeves in various embodiments.

Some embodiments of the corner sleeves may be provided with a spring member that is selectively movable between compressed and uncompressed positions, whereby the spring members exert a force against portions of the screen shield when portions of the screen shield are disposed within the corner sleeves and the springs are in the compressed positions. The front walls of the corner sleeves may be provided with one or more locking tabs that are positioned and shaped to slidably receive portions of the springs and allow the springs to be retained while being selectively movable between their compressed and uncompressed positions.

The system may be coupled with a flat panel monitor while the monitor is being stored or transported. The screen shield may be formed from an impact-resistant material to reduce the transmission of piercing and blunt forces to the screen of the flat panel monitor. In other uses, the screen shield may be provided to be generally transparent so that it may be coupled with the flat panel monitor while the flat panel monitor is in use. In this regard, anti-glare materials and/or coatings may be associated with the screen shield to reduce glare caused by external light sources.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
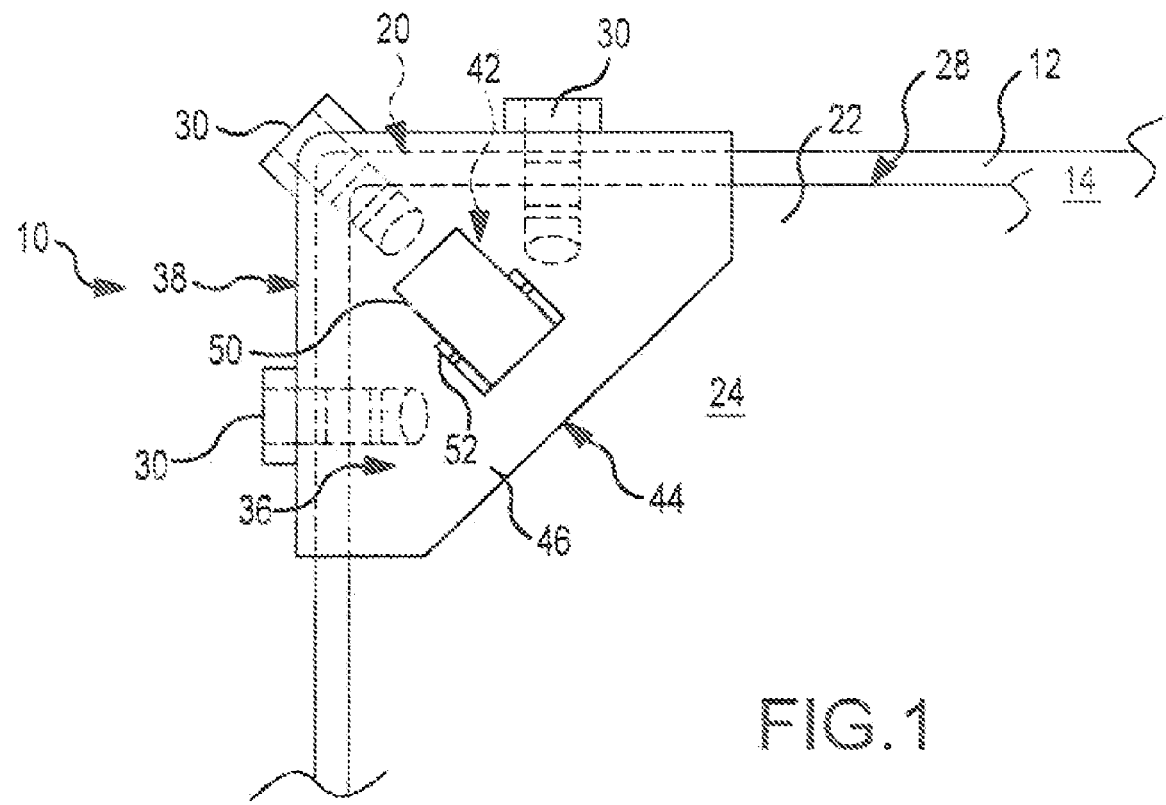
FIG. 1 depicts a partial, top plan view of one embodiment of a system for protecting the screen of a flat panel monitor.
Figure 2:
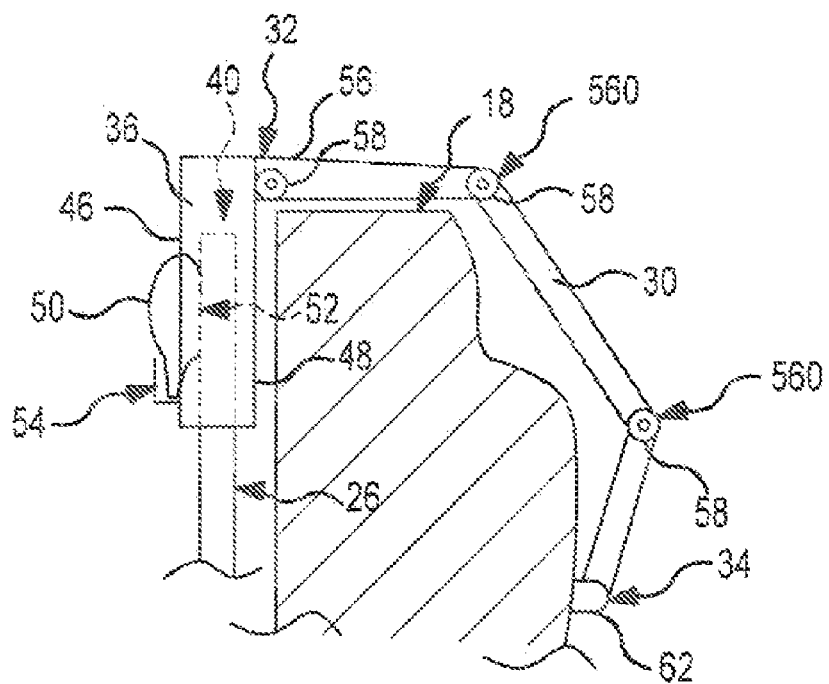
FIG. 2 depicts a partial, side elevation view of the system for protecting the screen of a flat panel monitor depicted in FIG. 1.
Figure 3:
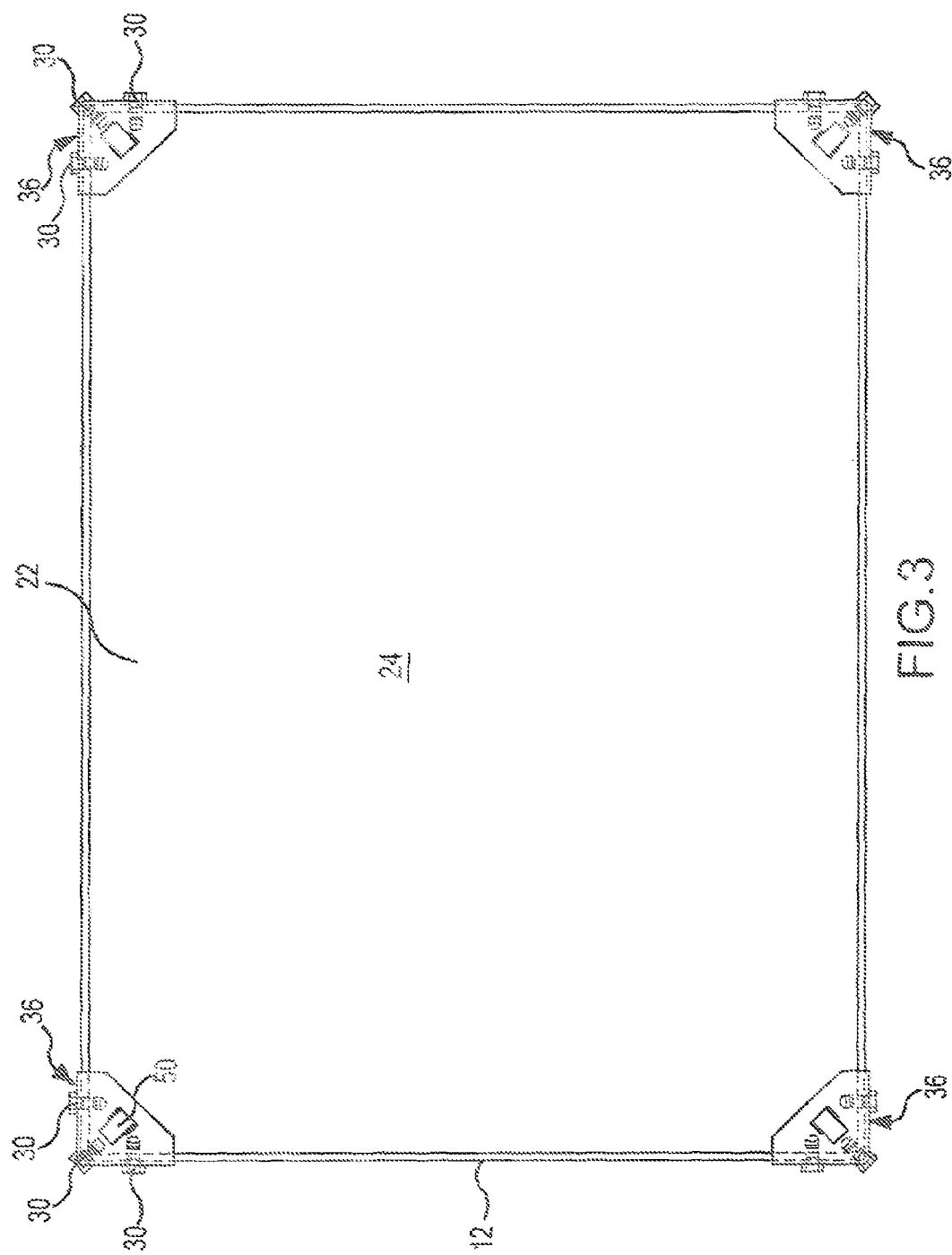
FIG. 3 depicts a partial, top plan view of an embodiment of a system for protecting the rectangular screen of a flat panel monitor.

With reference to FIGS. 1-3, a system 10 is provided for at least temporarily covering the screen of a flat panel monitor 12. It is contemplated that the system 10 may be used with a wide variety of different types of flat panel monitors, such as plasma displays, liquid crystal displays, organic light-emitting diode displays, light emitting diode displays, electroluminescent displays, and the like. In many embodiments, it is contemplated that the flat panel monitor 12 will generally have a front surface 14, and opposite rear surface 16, and sidewalls 18 that extend between the front surface 14 and the rear surface 16. In several embodiments, the sidewalls 18 will be positioned to provide upper and lower sidewalls and opposing end sidewalls. The sidewalls 18 will typically adjoin one another at a plurality of corners 20 of the flat panel monitor 12. In this manner, many of the flat panel monitors 12 may be provided with a generally rectangular shape. Other shapes and configurations are contemplated to which the system 10 may be easily adapted. Irrespective of the shape of the flat panel monitor 12, a viewing screen will typically be associated with the front surface 14.

In various embodiments, the system 10 will include a generally planar screen shield 22, having a first surface 24, an opposing second surface 26, and a peripheral edge portion 28. In various embodiments, the peripheral edge portion 28 will be provided to define a shape that mimics a shape of at least the front surface 14 of the flat panel monitor 12. In this regard, some embodiments of the screen shield 22 will be provided so that the peripheral edge portion 28 extends at least just beyond a peripheral edge portion of the viewing screen, associated with the front surface 14 of the flat panel monitor 12. In other embodiments, however, it is contemplated that the peripheral edge portion 28 of the screen shield 22 may be provided to closely approximate the shape and size of a peripheral edge portion of the viewing screen. It is contemplated that the screen shield 22 may be formed from a wide range of various materials, including wood, metal, various plastics, open or closed cell foams, and the like. The material selected in forming the screen shield 22 may be dictated by various factors that include cost and availability of materials, weight, durability, the ability to limit the transmission of impact and piercing forces, and the like. Similarly, the screen shield 22 may be provided in an array of various thicknesses, according to the intended uses of the system 10.

In various embodiments, a plurality of elongated retention arms 30 are provided to extend outwardly from the peripheral edge portion 28 of the screen shield 22. Each of the retention arms 30 will be provided with a proximal end portion 32 that is positioned adjacent the peripheral edge portion 28 of the screen shield 22. An opposite, free, distal end portion 34 extends in a spaced apart relationship with the peripheral edge portion 28. At least some of the retention arms 30 are provided to be movable between a releasing position, where the distal end portion 34 of the retention arm 30 is positioned to extend away from the screen shield 22, and at least one secured position, where the distal end portion 34 of the retention arm 30 is positioned to extend toward the second surface 26 of the screen shield 22. In at least some embodiments, the retention arms 30 are biased toward a secured position.

In various embodiments, the retention arms 30 will be operatively coupled with the system 10 adjacent the peripheral edge portion 28 of the screen shield 22. In some embodiments, the proximal end portions 32 of the retention arms 30 may be directly coupled with the screen shield 22, closely adjacent the peripheral edge portion 28. It is contemplated that such connections may occur on the first surface 24, second surface 26 or even the side of the peripheral edge portion 28. Such embodiments may require that the screen shield 22 be sized somewhat precisely to approximate the dimensions of the flat panel monitor 12 to which the screen shield 22 is being coupled. In some embodiments, this may require the dimensions of the screen shield 22 to be within an inch oversized or undersized with respect to the flat panel monitor dimensions. This will depend, of course, upon the area of the screen shield 22 at which the proximal end portion 32 of the retention arms 30 are secured. Other considerations may include the sizes and geometries of the retention arms 30.

In various embodiments, one or more sleeves may be used to couple the screen shield 22 with the flat panel monitor 12. In some embodiments, the sleeves may simply provide a pocket to receive a portion of the peripheral edge portion 28 of the screen shield 22. While it is contemplated that such pockets may be provided along a side portion, one or more corner sleeves 36 may be formed to have a peripheral edge portion 38 and an open pocket 40 that is shaped to releasably receive a portion of a corner portion 42 of the screen shield 22. In this manner, the corner sleeves 36 may be shaped to approximate shapes that define the corner portions 42 of the screen shield 22. The pocket 40 of each corner sleeve 36 will be generally defined by an open end portion, a first generally planar wall member 46 and a second generally planar wall member 48 that is positioned generally parallel with and opposite the first wall member 46. In some embodiments, the corner sleeves 36 may further include a spring member 50 that is selectively movable between compressed and uncompressed positions. In some embodiments, the spring member 50 may be positioned, with respect to the first wall member 46 to exert a force against portions of the screen shield 22 when a corner portion 42 of the screen shield 22 is within the pocket 40 and the spring member 50 is in its compressed position. In various embodiments, the first wall members 46 of the corner sleeves 36 are each provided with at least one opening 52 that penetrates the first wall members 46. In such embodiments, the spring members 50 may be positioned adjacent the openings 52 such that at least a portion of each spring member 50 may pass through the openings 52 and into the open pocket 40 to exert a compression force on the corner portions 42 of the screen shield 22. In this manner, the compression forces may assist in retaining the screen shield 22 in contact with the corner portions 42. While it is contemplated that various spring geometries may be used to accomplish the selective compression forces described, at least one embodiment provides spring members 50 that are formed to have at least two opposing, arcuately shaped sleeves that are biased from one another. In some embodiments, these spring members 50 may be formed such that the leaves are joined with one another at one end portion of the spring members 50 and separated from one another at an opposite end portion. In this manner, these spring members 50 may generally resemble a pair of tweezers.

In such embodiments, a locking tab 54 may be positioned closely adjacent the openings 52. The locking tab may be shaped to form an open locking pocket that can releasably receive an end portion of the spring members 50 when the spring members 50 are moved into a compressed position. Accordingly, in one manner of use, the spring members 50 may be slid from an uncompressed position to a compressed position, whereby a portion of the spring members 50 are secured within one or more locking tabs 54. In this manner, the spring members 50 may be retained in their compressed positions. Accordingly, it is contemplated that corner sleeves 36 may be provided in pairs associated with the upper corners of the flat panel monitor 12, the lower corners, or all four corners, and in various combinations thereof.

The use of corner sleeves 36 may provide a convenient structure on which some of the retention arms 30 may be located. With reference to FIG. 1, at least a pair of the retention arms 30 may be positioned closely adjacent a corner portion 42 of the screen shield 22 when the system 10 is in use. In such an orientation, a corner portion of the corner sleeve 36 is positioned intermediate the pair of retention arms 30. In some embodiments, the system 10 may be provided such that an additional retention arm 30 is positioned to extend from an apex of the corner portion. In this manner, improved stability may be attained in locating the corner sleeve 36 with respect to a corner 20 of the flat panel monitor 12.

Irrespective of whether the system 10 is provided with retention arms 30 that are coupled with the screen shield 22 or with one or more sleeves, such as the corner sleeves 36, the proximal end portions 32 of the retention arms 30 may be secured with such structures in a fixed or pivotable manner. Where the proximal end portions 32 are placed in a fixed engagement with such structures, a rigid connection may be attained through fasteners, adhesives, formed to be partially embedded within such structures, or formed to be in unitary construction therewith. Where the proximal end portions 32 are placed in a pivoting engagement with such structures, a hinge member 56 may be associated with the proximal end portions 32. In various embodiments, the hinge member 56 may be provided to move in non-swiveling, arcuate movements that enable the retention arms 30 to be moved selectively between a releasing position, where the distal end portions 34 of the retention arms 30 are positioned to extend away from the screen shield 22, and at least one secured position, where the distal end portions 34 of the retention arms 30 are positioned to extend toward the second surface 26 of the screen shield 22. In some embodiments, a spring member 58 may be provided to biased the retention arms 30 toward a secured position. Such spring members 58 may be provided in an array of geometries, however, simple coiled and/or leaf springs may provide desirable results.

In various embodiments, one or more of the retention arms 30 may be provided with one or more articulating joints 60 between the proximal end portions 32 and distal end portions 34. Such articulating joints 60 may be provided to move in a manner similar to the hinge members 56; that being a non-pivoting, arcuate manner that moves toward the afore-described secured positions. In at least one embodiment, depicted in FIG. 2, a pair of articulating joints 60 may be associated with the retention arms 30 to enable the retention arms 30 to "curl" from their proximal end portions 32 to their distal end portions 34. In this fashion, the distal end portion 34 may be easily positioned in an engaging relationship with a rear surface 36 of the flat panel monitor 12. It is contemplated that the size and shape of the flat panel monitor 12 may dictate the size of the retention arms 30 used, the numbers of articulating joints 60 therein, and the geometries attainable by the retention arms 30 as they move between their releasing and secured positions. In some embodiments, one or more of the retention arms 30 may be provided to be length-adjustable by forming the retention arms 30 from a plurality of sections that may be longitudinally moved with respect to one another in various, telescoping or other length adjustable manners.

In at least some embodiments, the distal end portions 34 of the retention arms 30 may be provided with a generally non-abrasive, deformable pad 62 that engages the flat panel monitor 12 when the retention arms 30 are in a secured position therewith. Similarly, other non-abrasive pads may be positioned along surfaces of the retention arms 30 that are likely to come into contact with the flat panel monitor 12. It is further contemplated that the retention arms 30 may be formed from materials that are less likely to damage the flat panel monitors than many hardened materials, such as metal, and the like.

While it is contemplated that the system 10 may be primarily used in a temporary engagement position with respect to flat panel monitors 12 as they are stored and transported from one location to another, it is contemplated that the system 10 may be secured with a flat panel monitor 12 when it is in use. Accordingly, various embodiments of the system 10 are contemplated as being formed from either opaque or transparent materials, depending upon their intended uses. Similarly, where it is intended that the system 10 be engaged with a flat panel monitor 12 while it is in use, a higher quality of material may be used to form the screen shield 22, such as a high quality polymer, or the like, that will cause as little visual distortion as possible. Likewise, it is contemplated that the screen shield 22 may be provided to reduce glare caused by external light sources. In this regard, the first surface 24 of the screen shield 22 may be treated with a chemical, known in the industry for reducing glare. In other applications, an anti-glare film may be applied to the first surface 24. In still other embodiments, the screen shield 22 may be formed from a material that, due to its composition, reduces an amount of glare from external light sources when compared with other materials, such as glass.

Although the system 10 has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A system for at least temporarily protecting a flat panel monitor screen, the system comprising:
    a planar screen shield having first and second opposing surfaces and a peripheral edge portion; and
    a plurality of elongated retention arms having proximal end portions operatively coupled with the peripheral edge portion of the screen shield and free, distal end portions;
    at least one retention arm extending outwardly from a first end portion of the peripheral edge portion of said screen shield;
    at least some of said plurality of retention arms being moveable between a releasing position, where the distal end portions of the retention arms are positioned to extend away from the screen shield, and at least one secured position, where the distal end portions of the retention arms are positioned to extend toward the second surface of the screen shield; said retention arms being biased toward the at least one secured position.

2. The system of claim 1 wherein at least some of the plurality of retention arms that are moveable between a releasing position and at least one secured position are provided with at least one articulating joint between the proximal and distal ends of the retention arms; the articulating joints including a spring that automatically biases at least a portion of the retention arms toward a secured position.

3. The system of claim 1 wherein at least some of the plurality of retention arms that are moveable between a releasing position and at least one secured position are provided with a plurality of articulating joints between the proximal and distal ends of the retention arms; each of the plurality of articulating joints including a spring that automatically biases at least a portion of the retention arms toward a secured position.

4. The system of claim 3 wherein the proximal end portions of at least some of the plurality of retention arms that are moveable between a releasing position and at least one secured position are operatively, pivotably coupled with the screen shield; the pivotable, proximal end portions of the retention arms including a spring that biases at least a portion of the retention arms toward a secured position.

5. The system of claim 1 wherein the peripheral edge portion of the screen shield is shaped to define at least a first corner portion and a second opposite corner portion; the first and second corner portions being positioned to be spaced-apart and generally opposite from one another; at least one of the retention arms being positioned closely adjacent the first corner portion and at least one of the retention arms being positioned closely adjacent the second corner portion.

6. The system of claim 5 wherein at least a pair of the retention arms are positioned closely adjacent the first corner portion, whereby the first corner portion is positioned intermediate the pair of retention arms, and at least a pair of the retention arms are positioned closely adjacent the second corner portion, whereby the second corner portion is positioned intermediate the pair of retention arms.

7. The system of claim 6 wherein an additional retention arm is positioned to extend from an apex of the first corner portion and an additional retention arm is positioned to extend from an apex of the second corner portion.

8. The system of claim 6 wherein the pair of retention arms closely adjacent the first corner portion are operatively coupled with a first corner sleeve having a peripheral edge portion and an open pocket that is shaped to releasably receive the first corner portion of the screen shield, the pair of retention arms extending from the peripheral edge portion of the first corner sleeve.

9. The system of claim 6 wherein the pair of retention arms closely adjacent the second corner portion are operatively coupled with a second corner sleeve having a peripheral edge portion and an open pocket that is shaped to releasably receive the second corner portion of the screen shield, the pair of retention arms extending from the peripheral edge portion of the second corner sleeve.

10. The system of claim 9 wherein the first corner sleeve and second corner sleeve each further comprising a spring member that is selectively movable between compressed and uncompressed positions; the spring members being positioned, with respect to the first corner sleeve and second corner sleeve to exert a force against portions of the screen shield when (i) portions of the screen shield are disposed within the open pockets of the first corner sleeve and second corner sleeve, and (ii) the springs are in the compressed positions.

11. The system of claim 10 wherein the first and second corner sleeves are each provided with openings that penetrate front walls of the first corner sleeve and second corner sleeve and pass through to the open pockets of the first corner sleeve and second corner sleeve; the springs being operatively coupled with the front walls of the first corner sleeve and second corner sleeve; the openings being sized to permit the passage of at least a portion of the springs into the open pockets of the first corner sleeve and second corner sleeve.

12. The system of claim 11 wherein the springs are each provided with at least two arcuately shaped leaves that are oppositely positioned and biased from one another.

13. The system of claim 12 wherein the front walls of the first corner sleeve and second corner sleeve are each further provided with a locking tab, closely adjacent the openings; the locking tab being positioned and shaped to slidably receive portions of the springs; the springs being selectively movable with respect to the locking tab between compressed and uncompressed positions.

14. The system of claim 1 wherein said screen shield is generally transparent.

15. The system of claim 1 wherein said screen shield is comprised primarily of an impact-resistant material.

* * * * *

UNITED STATES PATENT AND TRADEMARK OFFICE
CERTIFICATE OF CORRECTION

| | | |
|---|---|---|
| PATENT NO. | : 8,050,022 B2 | Page 1 of 1 |
| APPLICATION NO. | : 12/259812 | |
| DATED | : November 1, 2011 | |
| INVENTOR(S) | : McIntyre | |

It is certified that error appears in the above-identified patent and that said Letters Patent is hereby corrected as shown below:

Column 5, Line 59, "joints 60" should read --joints 560--.

Column 5, Line 61, "joints 60" should read --joints 560--.

Column 5, Line 65, "joints 60" should read --joints 560--.

Column 6, Line 6, "joints 60" should read --joints 560--.

Signed and Sealed this
Third Day of January, 2012

David J. Kappos
*Director of the United States Patent and Trademark Office*